A. A. AUST.
COMBUSTION ENGINE.
APPLICATION FILED MAR. 1, 1917. RENEWED APR. 6, 1921.
1,401,126.
Patented Dec. 27, 1921.
6 SHEETS—SHEET 4.
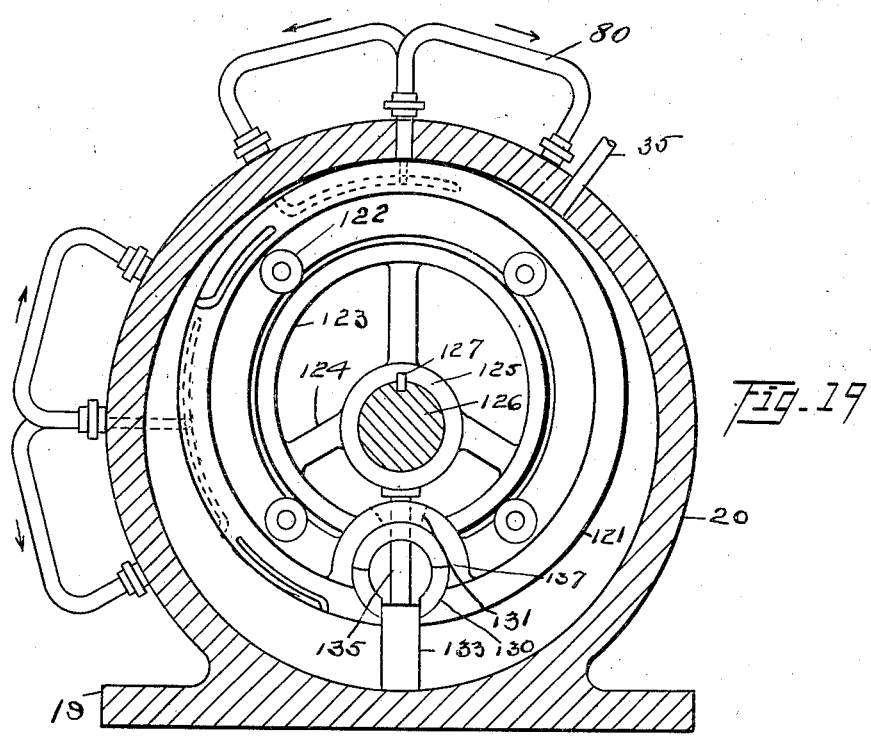
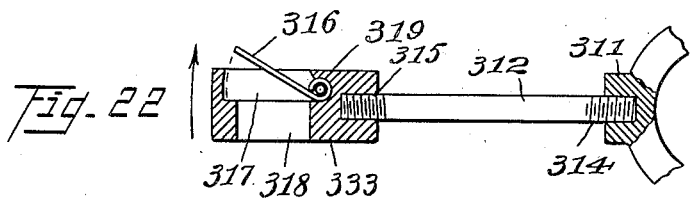
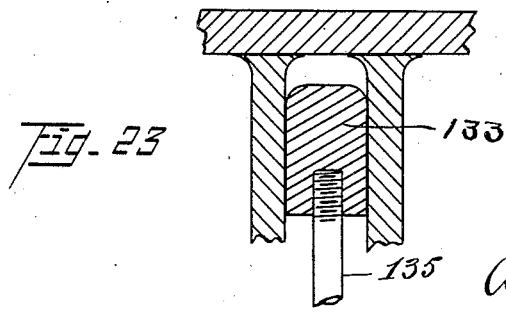

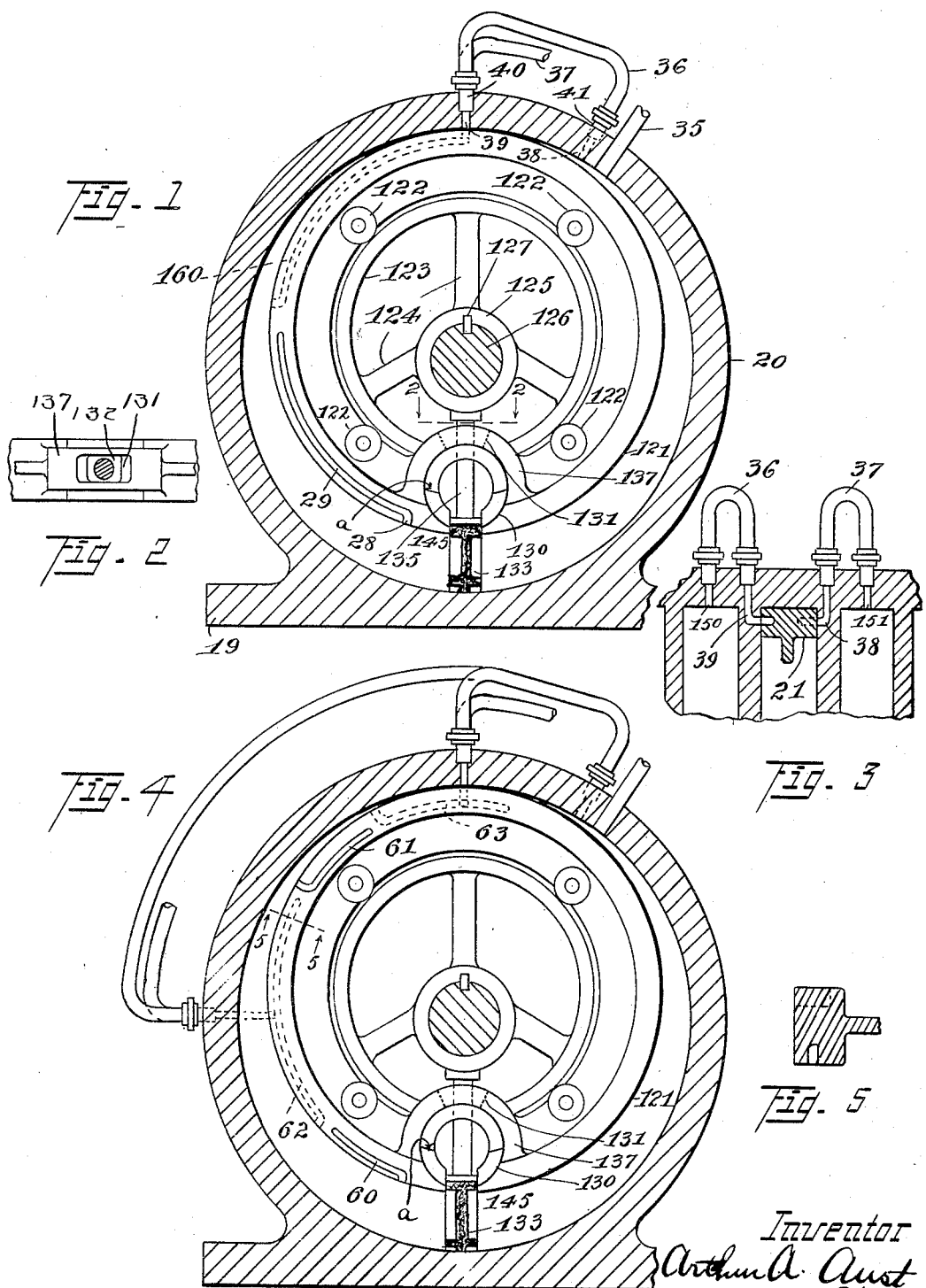

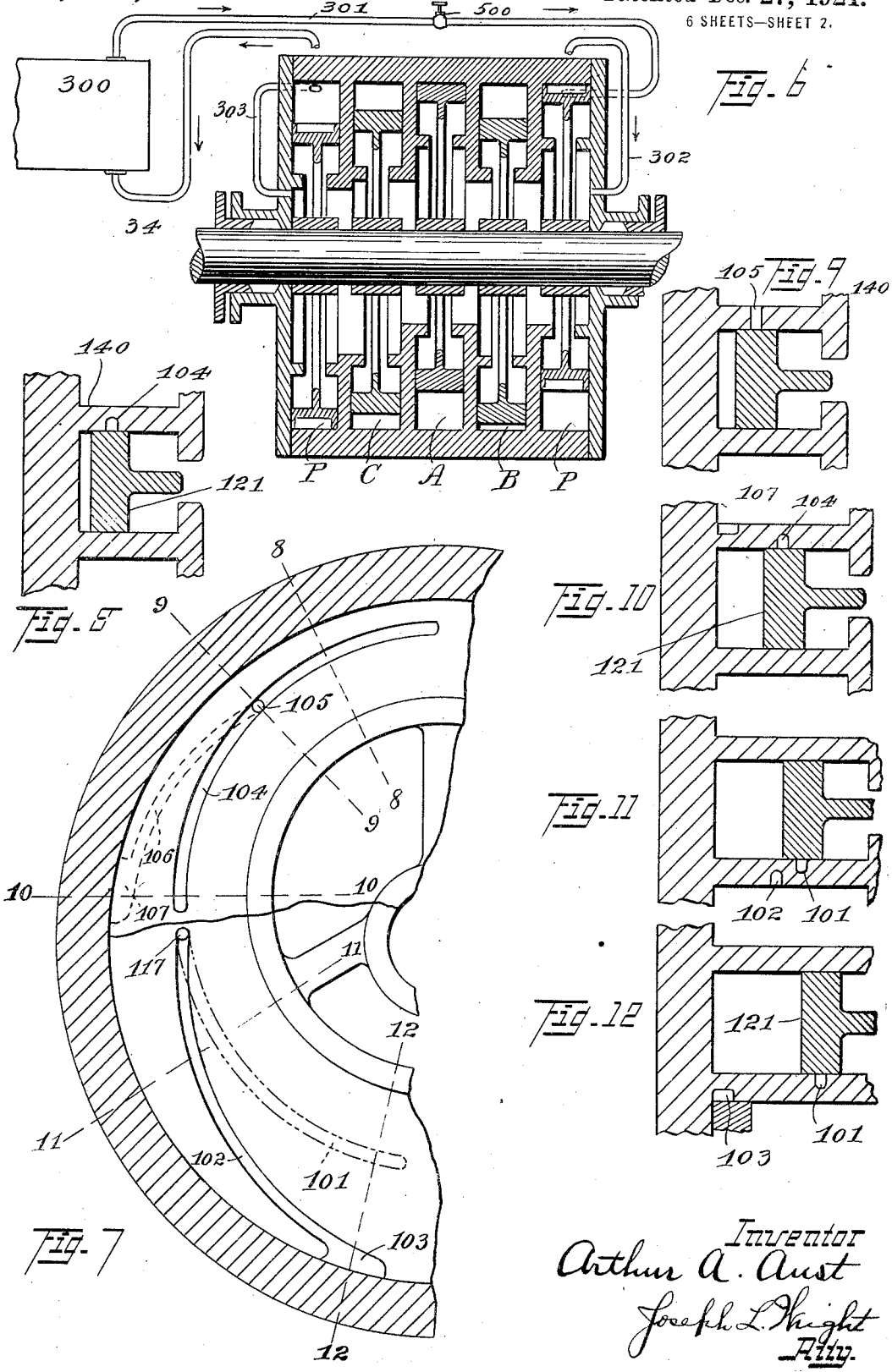

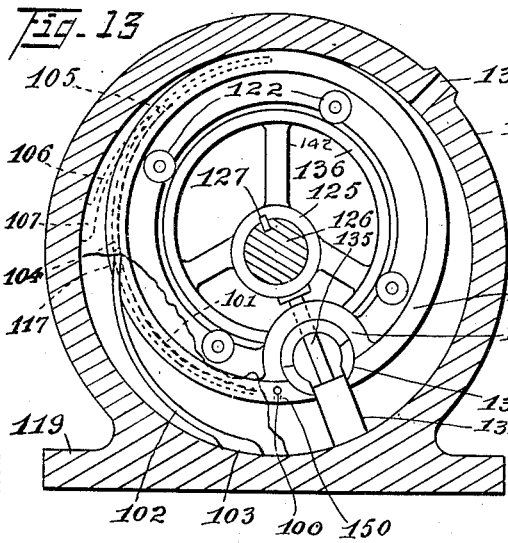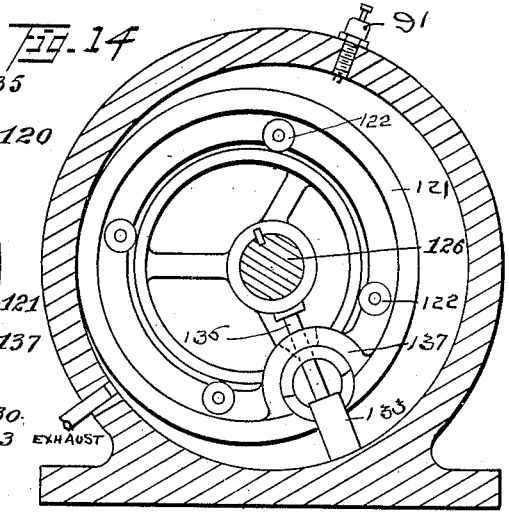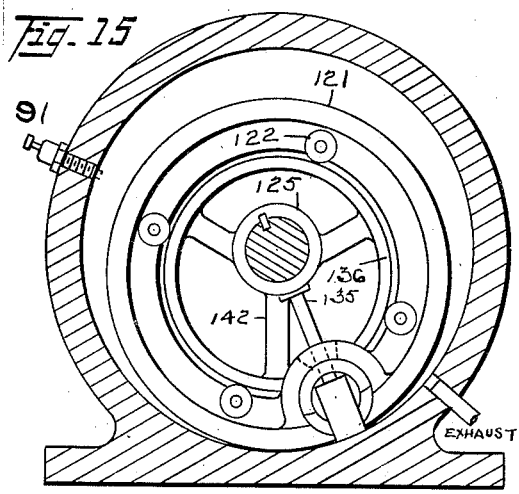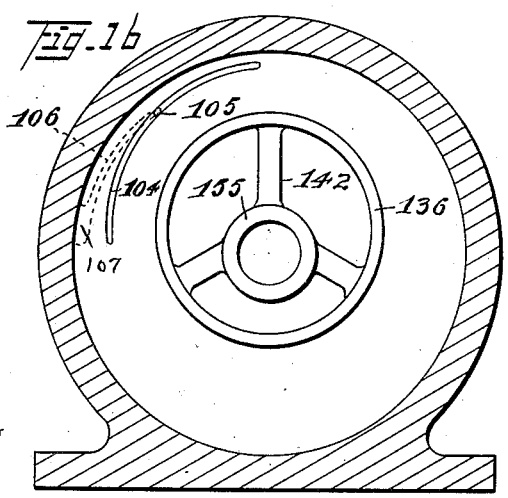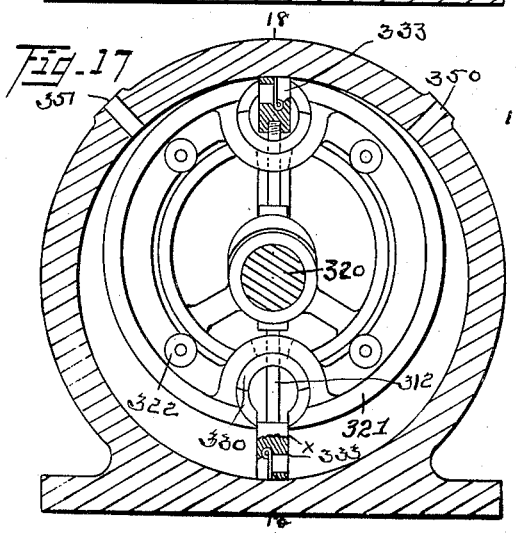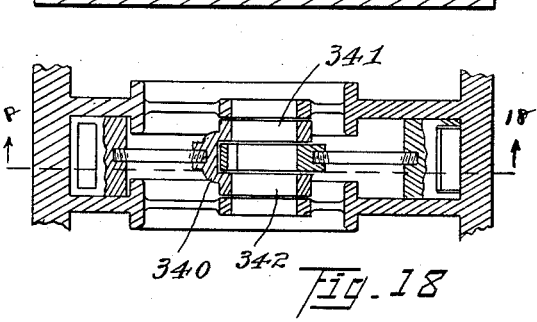

A. A. AUST.
COMBUSTION ENGINE.
APPLICATION FILED MAR. 1, 1917. RENEWED APR. 6, 1921.

1,401,126.

Patented Dec. 27, 1921.

Inventor
Arthur A. Aust
Joseph L. Wright
Atty.

UNITED STATES PATENT OFFICE.

ARTHUR A. AUST, OF BEDFORD, OHIO.

COMBUSTION-ENGINE.

1,401,126.  Specification of Letters Patent.  Patented Dec. 27, 1921.

Application filed March 1, 1917, Serial No. 151,661. Renewed April 6, 1921. Serial No. 459,083.

*To all whom it may concern:*

Be it known that I, ARTHUR A. AUST, a citizen of the United States, residing at Bedford, in the county of Cuyahoga and State of Ohio, have invented certain new and useful Improvements in Combustion-Engines, of which the following is a specification.

My invention relates to combustion engines of the rotary type.

The object of my invention is to produce an engine of this character wherein the number of working parts is reduced to a minimum and the parts so designed that the engine is simple in construction and efficient in operation.

With my invention the combustion chamber wherein the explosion takes place is entirely separate from the compression chamber or chambers. Arrangements are made whereby one compression chamber serves to supply fuel to a plurality of combustion chambers.

Each chamber is provided with a rotatable ring operated by a rotating piston. The relation between the ring and piston is such that the power is applied to the end of the piston rod thereby securing the maximum efficiency. The ring of each chamber is tangent to the inner surface of the chamber and in rotating always engages the point of tangency.

The piston rod is eccentric in relation to the movement of the ring and in rotating presses against the inner surfaces of the chamber.

The wall of each chamber is provided with suitable ports for admitting fuel. The admission of the fuel is controlled by suitable openings or ports in the rings operated by the piston rods.

The piston rod and ring serve to divide the compression chamber into two portions, one portion for receiving and the other for compressing the fuel. The combustion chamber is likewise divided into a receiving and ignition chamber, and an exhaust chamber. Various means are shown feeding the supply of fuel between the compression and combustion chambers.

Arrangements are made for cooling the engine by a specially designed water pump. Provision is made to drain off the water and at the same time to admit air under pressure to force any accumulation of water from the various sections or compartments.

The design of the engine is such that the various parts are interchangeable and adjustable so that the number of compression chambers and combustion chambers can be increased or diminished as desired.

In other words the entire engine is composed of a series of interchangeable units which can be built up to work with two, three, four, five, six, seven, etc., combustion chambers.

My invention is illustrated in the accompanying drawings, wherein:

Figure 1 is a sectional view showing the interior of a compression chamber.

Fig. 2 is a sectional view on line 2—2 of Fig. 1.

Fig. 3 is a portion in section showing the piping between a compression and two combustion chambers.

Fig. 4 is a sectional view of a compression chamber arranged to supply four combustion chambers.

Fig. 5 is a sectional view on the line 5—5 of Fig. 4.

Fig. 6 is a sectional view of an assembled engine showing the water cooling system.

Fig. 7 is a sectional view showing the arrangement of grooves and openings in the walls when the rings are set at different points of tangency.

Fig. 8 is a sectional view on line 8—8 of Fig. 7.

Fig. 9 is a sectional view on line 9—9 of Fig. 7.

Fig. 10 is a sectional view on line 10—10 of Fig. 7.

Fig. 11 is a sectional view on line 11—11 of Fig. 7.

Fig. 12 is a sectional view on line 12—12 of Fig. 7.

Fig. 13 is a sectional view showing a compression chamber.

Fig. 14 is a sectional view showing a combustion chamber.

Fig. 15 is a sectional view showing a combustion chamber.

Fig. 16 is an interior view of a compression chamber with the operating parts removed.

Fig. 17 is a section showing the details of the pump mechanism.

Fig. 18 is a section on the line 18—18 of Fig. 17.

Fig. 19 is a modification of the compression chamber shown in Fig. 4 wherein the rings are arranged at different points of tangency.

Fig. 22 is a detail of one of the pump pistons.

Fig. 23 is a detail showing a modified form of piston.

Figure 20:
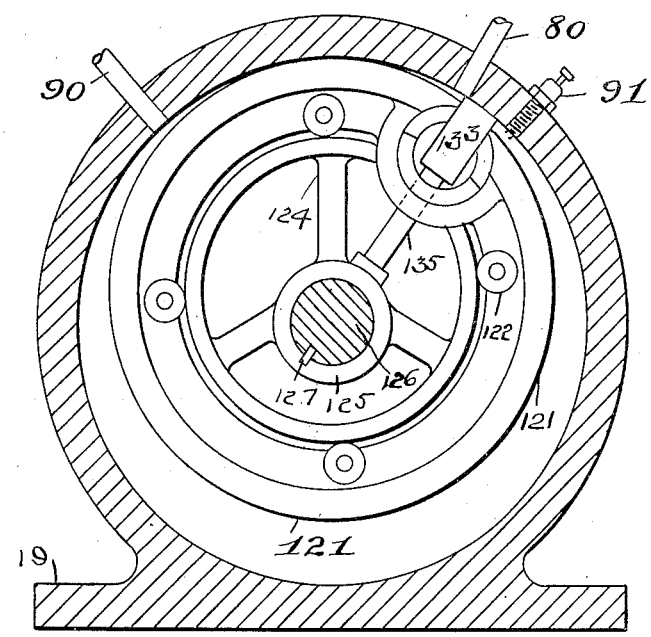
Fig. 20 shows a combustion chamber operating in conjunction with the compression chamber of Fig. 19.

Referring first to Figs. 13, 14, 15 and 16, I have illustrated one modification of my device wherein the single compression chamber shown in Fig. 13 is used to supply fuel to the two combustion chambers, shown in Figs. 14 and 15, by means of grooves placed in the walls of the compression chamber which are arranged to coöperate with similar grooves placed in the walls of the combustion chambers lying on either side of the compression chamber. The combustion chamber shown in Fig. 14, lies in the rear of the compression chamber (Fig. 13) while the combustion chamber (Fig. 15) is on the near side of the compression chamber. In Figs. 13, 14 and 15, it will be noted that the pistons all lie in or occupy the same relative positions, while the rings used for dividing the chambers into two sections are at different points of tangency in relation to the inner cylindrical surface of the compression and combustion chambers.

Fig. 16 shows a section of the compression chamber wherein the groove 104, shown in full lines, is made in the rear wall of the compression chamber, and coöperates with a similar groove 106 in the wall of the rear combustion chamber. The wall of the compression chamber which adjoins the near combustion chamber of Fig. 15 is provided with similar grooves shown in Fig. 13 in dotted lines. The groove 101 is made in the far wall of the compression chamber, while the groove 102 is made in the near wall of the combustion chamber adjoining the compression chamber.

The grooves of the compression chamber and of the rear combustion chamber, of Fig. 14, are joined by means of the opening 105 which extends entirely through the separating wall. In a similar manner the grooves of the compression chamber and of the combustion chamber (Fig. 15) are joined by the opening 117 extending through the separating wall.

Referring to Fig. 13, the main shaft 126 carries collar 125 to which is fastened the rod 135, one end of which is threaded into the collar as shown in Fig. 22. The opposite end of this rod 135 carries the piston 133 which in rotating presses against the walls and circumference of the cylinder or chamber. During its rotation, the piston 133 carries with it the movable ring 121. This ring is provided with the roller bearings 122 which rest upon or engage the periphery of the flange 136.

The ring 121 is centered eccentrically in relation to the shaft. The ring 121 is provided with an extension or ring shaped section 137 through which the rod 135 passes. Within this ring 137 is mounted a rotatable split ring 130. This ring 130 is arranged to rotate in order to take up the variation of the piston 133 which is eccentric in relation to the center of the ring 121. The rings 130 and 137 are shouldered down at A (Fig. 1) to reduce friction and allow water free access to interior around piston rod 135. The opening 31 in ring 137 through which the rod 135 passes is provided with enough clearance (as shown in Fig. 2) to permit the eccentric movement of the piston 133 and the corresponding movement of the arm 135. As the ring rotates the arm 133 naturally slides back and forth through the close fitting opening 32 in the ring 130.

The arrangement of the moving parts of the combustion chambers, shown in Figs. 14 and 15, are identical with that of the compression chamber (Fig. 13). In Fig. 13, however, the compression chamber is provided with an intake valve 135 while the combustion chambers are each provided with spark plugs and exhaust ports or valves.

By comparing Figs. 13, 14, and 15, it will be noted that the three rings 121 are each tangent to the inner surface of its respective chamber, but that the point of tangency is located at a different position in respect thereto. In Figs. 13, 14 and 15, the ring 121 of the compression chamber entirely covers the grooves 101 and 104 on both the near and far walls.

The ring 121 is provided with an opening or port 100 which extends entirely through the ring in such a position to coöperate with the grooves 101 and 104. The periphery of the ring 121 is also provided with an opening or port 150 which joins the port 100.

The gas or fuel is first forwarded through the port 150 and when the port 100 coöperates with the groove 101 the fuel is then forced into the near combustion chamber (Fig. 15) through the opening 117, groove 102 and recess 103.

When the port 100 engages the groove 104 the fuel is forced into the rear combustion chamber (Fig. 14) through the opening 105, groove 106 and recess 107. The recesses 103 and 107 are not entirely covered by the rings of their respective combustion chambers and consequently the fuel enters the chambers between the points of tangency of the rings and the spark plugs.

The ring of the combustion chamber of Fig. 15 entirely covers the grooves 102 of its wall, while the ring of the combustion chamber of Fig. 14 entirely covers the groove 106 of its wall.

Fig. 16 plainly shows the groove 104 of the rear wall of the compression chamber, while the groove in the wall of the combination chamber of Fig. 14 is shown at 106 in dotted lines. This figure shows the flange 136 and supporting spokes 142 extending to the bearing 155.

Similar grooves are made in the wall which separates the combustion chamber from the compression chamber (Fig. 14).

The arrangement of the grooves and rings are shown in detail in Figs. 7, 8, 9, 10, 11 and 12.

Referring particularly to Fig. 7, it will be noted that the near wall of the combustion chamber of Fig. 15 is cut away so as to show the groove 104 in the rear wall of the compression chamber.

Fig. 8, which is a section on line 8—8 of Fig. 7, shows the ring 121 in its relative position to the groove 104 in the wall 140 which separates the compression chamber from the rear combustion chamber (Fig. 14).

Fig. 9, which is a section on line 9—9 of Fig. 7, shows the opening 105 extending entirely through the wall 140 joining the compression and rear combustion chambers.

Fig. 10 which is a section on line 10—10, shows the groove 104 in relation to the ring 121 and also the opening or recess 107 which forms the extension of the groove 106 of the rear combustion chamber.

It will be noted that Figs. 8, 9 and 10 show the location of the openings or grooves of the compression chamber in relation to the rear combustion chamber (Fig. 14).

Fig. 11, which is a section on the line 11—11 of Fig. 7, shows the location of the groove 101 in relation to the ring 121 and also the location of the groove 102 of the near combustion chamber (Fig. 15).

Fig. 12 shows the location of the groove 101 in relation to the ring 121, while the recess 103 of the near combustion chamber is also shown.

The type shown in Figs. 13, 14, 15 and 16 and in detail in Figs. 7, 8, 9, 10, 11 and 12 relate to that type wherein but a single compression chamber serves two combustion chambers with coöperating grooves extending directly through the walls.

Fig. 1 is a modification wherein a single compression chamber serves two combustion chambers, but instead of having grooves in the walls, the various sections or chambers are connected by a system of piping.

With the arrangement shown in Fig. 1 a compression chamber as illustrated is provided with the same essentials as shown in Fig. 13. With this particular modification as shown the rings 121 of the compression and combustion chambers are all tangent at the same point, but the piston rods or arms are set at positions which correspond to the points of tangency of the rings illustrated in Figs. 13, 14 and 15.

In Fig. 1 the compression chamber is connected to the two combustion chambers by means of the pipes 36 and 37, as illustrated in Fig. 3.

As shown in Fig. 3 the combustion chamber to the left is provided with an opening 150 which joins the pipe 36. A similar opening 39 extends from the pipe 36 into the near wall of the compression chamber. Likewise the combustion chamber to the right is provided with an opening 151 which joins the pipe 37. The opposite inner wall of the compression chamber is provided with an opening 38 which also joins the pipe 37.

Referring now to Fig. 1, it will be noted that the ring 121 of the compression chamber is provided with the groove 29 on the near side which is provided with the curved extension 28 which opens out upon the periphery of the ring. A similar groove 160 is made on the opposite side of the ring 121.

By considering Figs. 1 and 3 it will be seen that as the piston of the compression chamber rotates the fuel is drawn through the intake 35 and compressed. When the ring in rotating causes the grooves 29 to come opposite the opening 39 the compressed fuel will be forced through the pipe 36 into the combustion chamber to the left. This supply will continue until the groove is carried past the opening 39 after which the groove on the opposite side of the ring 121 coöperates with the opening 38 thereby forcing fuel under compression into the combustion chamber at the right through the pipe 37.

The fuel in the combustion chambers is ignited by means of spark plugs in the same manner as shown and described in connection with Figs. 14 and 15.

Fig. 4 is another modification wherein a single compression chamber serves to supply four combustion chambers. This modification is similar to that of Fig. 1, the difference being that the ring 121 is provided with four sets of grooves, two being located on each side of the ring. In this instance the openings from the pipes which join the combustion and compression chambers are located at different intervals so that the supply of fuel is admitted to the compression chambers in 1, 2, 3, 4 order.

It will be noted that the two grooves 60 and 61 on the near side of the ring 21 are so spaced that they are out of line, that is they are located at different distances from the periphery. The two grooves 61 and 62 on the rear side of the ring are likewise out of line with one another. The openings in the side walls which join the pipes for carrying the fuel into the combustion chambers are arranged to coöperate with the grooves in proper sequence.

Fig. 5 which is a section of the ring 121 on line 5—5 of Fig. 4 shows the groove 61 and its location in respect to the outer surface of the ring.

Referring to Fig. 19, the rings of the compression and combustion chambers instead of being tangent at the same points have different points of tangency and arranged similar to those of Figs. 13, 14 and 15 excepting, that instead of supplying but two combustion chambers four combustion chambers are supplied from the same compression chamber.

One of these combustion chambers supplied by the pipe 80 is shown in Fig. 20. The rings 121 of each chamber occupy a different point of tangency. These points are indicated at 121ª, 121ᵇ, 121ᶜ and 121ᵈ in Fig. 19. Each combustion chamber in addition to being provided with an intake port 80 joining the piping extending from the compression chamber is also provided with an exhaust port 90 and a spark plug 91.

Figure 24:
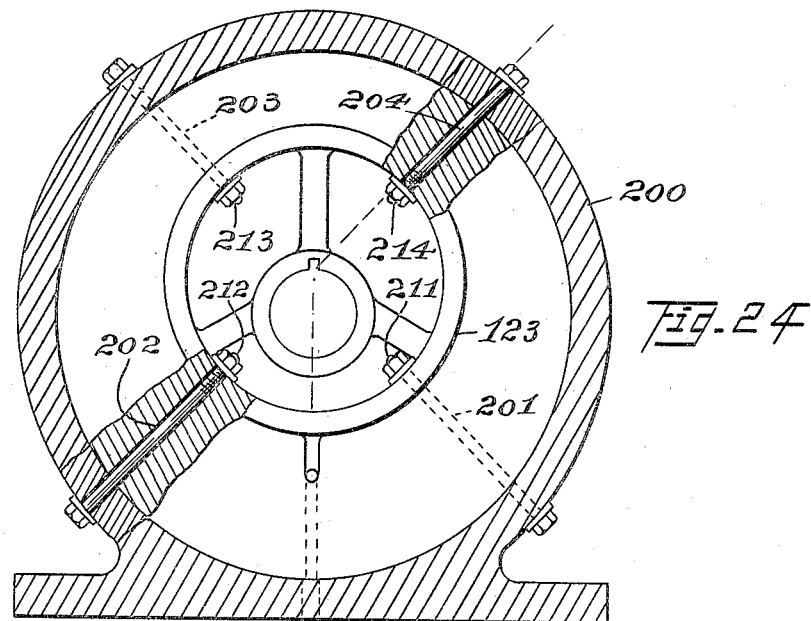
Figs. 24 and 25 are sectional views showing the separating walls and flanges mounted as individual units.
Figure 25:
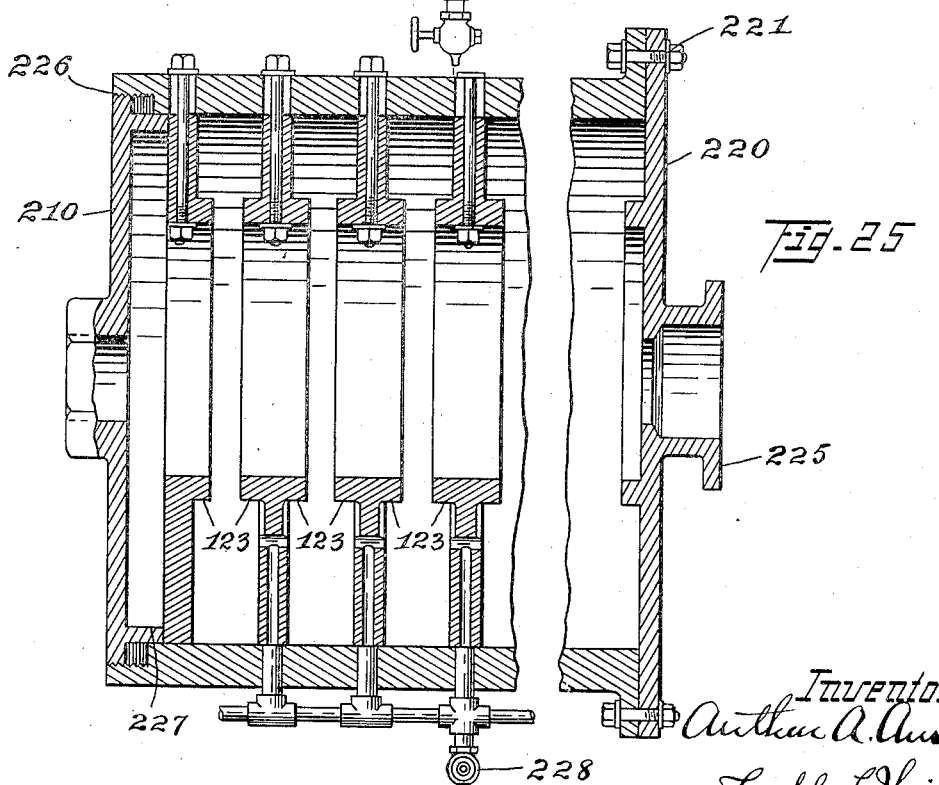

Referring to Figs. 24 and 25 I have shown special means for supporting the separating walls and carrying the flanges or rings which form the bearings for the traveling rings 21 of the compression and combustion chambers. It will be noted that each separating wall or unit and the main case 200 are provided with openings through which extend the bolts 201, 202, 203 and 204. These bolts after passing through the units are adjusted and held in proper position by means of the nuts 211, 212, 213 and 214. With this arrangement of supporting the units they can be readily adjusted and removed in case of any wear.

The main casing or cylinder 200 is provided with the end plate 220 which is rigidly fastened to the case by means of the bolts and nuts 221. This end 220 is provided with a bearing 225 for supporting the shaft. The opposite end of the case 200 is threaded at 226 so as to receive the end plate 210 which is also threaded and arranged to engage the threaded portion 226. The end section 210 is provided with the flange 227 which bears against the wall of the compression or combustion chamber as the case may be. By turning or properly adjusting the end section 210 the various compression rings and walls are maintained in proper relation.

With the arrangement illustrated in Figs. 24 and 25 it will be noted that the compression and combustion chambers are practically surrounded by water so as to prevent any undue overheating.

Arrangements are made for draining off the water when desired by means of the valve 228. When this valve is opened the water is readily drained off by means of individual openings into each compression and combustion chamber.

Fig. 6 shows in a general manner the assembly of the engine employing a single compression chamber A and two combustion chambers B and C located on either side.

The water cooling system is regulated by the pumps P, one being located at each end opposite the combustion chambers. The circulation of the water from the supply tank or radiator 300 is in the direction indicated by the arrows. Each pump is provided with an intake and exhaust port. The water is drawn in from the tank through the intake port of the pump P to the right. The water is then forced through the exhaust port 302 into the water jackets surrounding the combustion and compression chambers after which it is drawn through the intake port 303 of the pump P to the left after which the water is forced back to the tank 300 through the exhaust port of the pump to the left.

Figure 21:
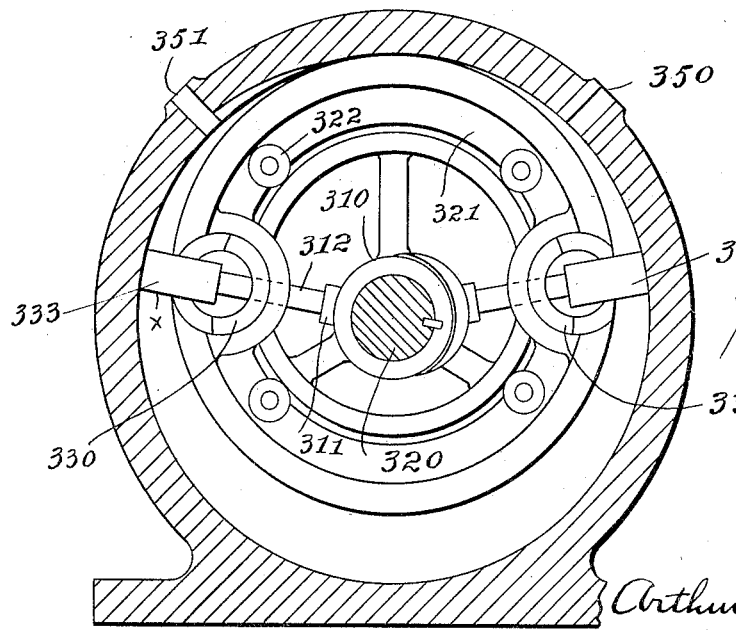
Fig. 21 is a detail of the pump mechanism.

The construction of the pump is shown in detail in Figs. 17, 18, 21 and 22. As shown in Figs. 17, 18 and 21, it will be noted that the pump is similar in construction to the compression and combustion chambers. The pump is provided with a ring 321 which rides upon the roller bearings 322. In the present instance the ring 321 is not provided with grooves or openings of any description. The ring 321 instead of being operated by a single piston is operated by two pistons 333.

As shown in Fig. 22 each piston 333 is provided with the opening or port 318 and the flange 317 upon which the leaf valve 316 normally rests. The valve 316 is hinged at 319 and when the piston 333 is rotating in the direction of the arrow the pressure of the water is against the upper surface of the valve 316, therefore forcing it firmly against the flange 317 thereby preventing any leak through the opening 318.

As shown in this figure the piston 333 is adjustable upon the rod or arm 312 by means of the threaded portion 315. Likewise the arm 312 is adjustable upon the ring 311 by means of the threaded portion 314.

By regulating these threaded portions the end surface of the piston 333 which engages the inner circumference of the pump chamber can be adjusted to take up any wear.

The pistons and arms of the compression and combustion chambers are likewise arranged with this same adjustment so the pistons can be arranged to properly engage the inner circumference of their respective walls.

It will be noted that one of the pistons 333 designated as X is mounted upon and keyed to the shaft 326. The other piston 333 instead of being fastened to the shaft is mounted or attached to a rider or idler arranged to turn loosely upon the shaft 326. The idler 340 shown in Fig. 18 is provided with the yokes or rings through which the shaft 326 passes. The ring or bearing to which the piston 333 designated as X is mounted lies between the rings 341 and 342 of the idler. From this arrangement it will be seen that the piston 333 designated as X is operated directly by the shaft 326, while the other piston 333 turns freely upon the shaft. The ring 321 is, however, provided with two split rings or collars 330 through which both pistons pass.

With this arrangement the shaft 326 in rotating carries with it the piston 333 which causes the ring 321 to rotate. This ring in rotating carries with it the other piston 333 which is loosely mounted upon the shaft. This arrangement is necessary as the center of the ring 321 is eccentric to the center of the shaft upon which the two pistons are mounted. In view of this eccentric relation it is necessary to make allowances for the pistons to assume the positions shown in Fig. 21 when the maximum volume of water lies under and between the two pistons.

Referring to Fig. 17, it will be noted that the two pistons are in line and the center of the shaft 326 is directly in line with the center of the ring 321 on the vertical line 18—18. In this position the chamber is divided into two equal parts and the volume of water in each part is the same.

In passing from this position to the position shown in Fig. 21, the volume of water increases below and between the two pistons. In order to take care of this contingency the leaf valves shown in Figs. 17 and 22 are provided. In assuming the position of Fig. 21 the valve 316 of the piston 333 to the right of Fig. 21 is caused to open due to the tendency of a vacuum to be formed between the two pistons and the power portion of the chamber. The opening of this valve allows water to pass into the space between the two pistons thus automatically compensating for the variation in position of the pistons.

Fig. 21 shows the pistons in their maximum eccentricity as to alinement. When the pistons start to pass from this position to assume the position shown in Fig. 17 the lower space between the pistons gradually decreases whereupon the valve 316 of the piston 333 designated as X opens and allows the water to flow into the upper partition. The groove at I allows last of water to escape through exhaust port 351.

From the foregoing description it will be noted that the pistons assume varying positions but the valves 316 compensate for the varying space between the pistons.

The foregoing description in connection with the pump shows that the water is drawn in through the intake 350 and then forced through the exhaust 351. In order to convert the pump to a water motor it is only necessary to force water under pressure and use the opening 351 as an intake and the opening 350 as an exhaust. Instead of reversing the intakes and exhausts the valves 316 can be reversed and the opening 350 used as an intake and the opening 351 as the exhaust.

From the foregoing it will be noted that the device shown in Figs. 17, 18 and 21 can be used as a pump or as a water motor at will, or a compressed air motor-meter-measuring pump.

Referring to Figs. 1 and 4 it will be noted that the piston 133 is provided with packing material 145 to prevent the escape of gas or fuel from one compartment to another. The pistons of the other figures can likewise be provided with this packing material. The sides of the rings 121 and 321 which engage the near and far walls of their respective chambers can also be provided with suitable packing material.

Ordinarily this packing material will not be needed as the end of the piston 133 engages the inner circumference of the chamber while the outer surfaces of the piston and the outer surfaces of the ring 121 engage the side walls which separate one compartment from another.

As shown in Figs. 24 and 25, the side walls and bearing surfaces for the rotating rings 121 are individually and adjustably mounted within a cylinder or case. The shoulders or flanges 123 of which there are two for each ring 121 are so arranged that the roller bearings 122 which are mounted upon either side of the ring 121 ride upon the flanges 123. The manner in which the outer surfaces of the rings 121 engage the separating walls are shown in Figs. 8 to 12 inclusive and also in Fig. 6. The engagement of the outer surfaces of the rings with the separating walls and the engagement of the pistons with the separating walls and with the inner circumference of the cylinder prevents any escape of fuel from one compartment to another excepting through the port openings provided for that purpose.

By using the form of construction shown in Figs. 24 and 25 it is possible to leave a blank compartment opposite each combustion chamber so that the water in circulating will completely fill the blank compartment adjoining the combustion chamber and also fill the space around the shaft 126 and the inner surface of the flanges 123 and inner surfaces of the rings 121.

Referring to Fig. 6, it will be noted that a two-way valve 500 is placed in the supply pipe 301. By turning this valve in one position water circulates through the pipe and when turned in another position air is supplied in place of the water in order to drive out all surplus water which may have accumulated in any of the water jackets surrounding the various pump combustion and compression chambers.

By referring to the compression chambers shown in Figs. 1, 4, 13 and 19, it will be noted that piping or ports for supplying the combustion chambers are shown extending half way around the circumference which simply represents one-half of a unit. In order to complete the unit and arrange to have the explosions take place at equal intervals throughout the entire rotation of the shaft it is necessary to supply an additional unit in duplicate to occupy the other half of the circumference.

Referring to Fig. 22, the valve 316 is shown open in an exaggerated manner. In reality this valve will lift up just far enough to prevent engagement with the edge of the ring 321 with which the piston 333 is in contact.

Having thus described my invention what I desire to secure by Letters Patent is:

1. In a combustion engine, the combination of a single compression chamber provided with a rotatable ring, a plurality of combustion chambers, means controlled by said ring for regulating the supply of fuel from the compression chamber to said combustion chambers at stated intervals.

2. In a combustion engine, the combination of a plurality of compression chambers, of a plurality of combustion chambers greater in number than the number of compression chambers, a certain number of said combustion chambers being allotted to each compression chamber, a rotatable ring individual to each chamber, means controlled by said rings for regulating the supply of fuel for each compression chamber to its allotted combustion chamber at stated intervals.

3. In a combustion engine, the combination of a single compression chamber provided with a ring tangent to the inner surface of said chamber, of a plurality of combustion chambers each provided with a ring tangent to the inner surface of its respective chamber, means controlled by said rings for regulating the supply of fuel from the compression chamber to said combustion chambers at stated intervals.

4. In a combustion engine, the combination of a single compression chamber provided with a movable ring tangent to the inner surface of said chamber, of a combustion chamber separate from said compression chamber also provided with a movable ring tangent to its inner surface, means controlled by said rings for regulating the supply of fuel between the compression and combustion chambers.

5. In a combustion engine, the combination of a compression chamber, of a combustion chamber separate from said compression chamber, a ring for each of said chambers, means controlled by said rings for regulating the supply of fuel between said chambers.

6. In a combustion engine, the combination of a single compression chamber provided with a ring tangent to the inner surface of said chamber, a piston arm associated with said chamber, said piston arm and said ring serving to divide said chamber into two parts, a plurality of combustion chambers each provided with a ring tangent to the inner surface of its respective chamber and also with a piston arm, the arm and ring of each chamber serving to divide said chamber into two parts, means for admitting a supply of fuel into one part of said compression chamber, and means controlled by said piston for compressing the supply of fuel in the other part of said compression chamber, means controlled by said rings for admitting the compressed fuel into one part of each of the combustion chambers at stated intervals, and means for exhausting the fuel after combustion from the other parts of said combustion chambers.

7. In a combustion engine, the combination of a single compression chamber provided with a rotatable ring, a piston rod for rotating said ring, said rod and said ring serving to divide said compression chamber, of a plurality of combustion chambers each provided with a rotatable ring and a piston rod for operating its respective ring, means controlled by said rings for regulating the supply of fuel from the compression chamber to said combustion chambers at stated intervals.

8. In a combustion engine, the combination of a compression chamber, a plurality of combustion chambers, a rotatable ring individual to each of said chambers, a fuel intake port for the compression chamber, a fuel exhaust port from the compression chamber to each of said combustion chambers, and means controlled by said rings for admitting fuel from said compression chamber to each of said combustion chambers in sequence.

9. In a combustion engine, the combination of a compression chamber provided with a fuel intake port, a plurality of combustion chambers each having an intake port opening into said compression chamber, a rotating ring individual to each of said chambers, and means controlled by said rings during each cycle of operation for admitting fuel from said compression chamber to said combustion chambers through said intake openings in sequence during said cycle.

10. In a combustion engine, the combination of a single compression chamber provided with a ring tangent to the inner surface of said chamber, of a plurality of combustion chambers each provided with a ring tangent to the inner surface of its respective chamber, means controlled by said rings for regulating the supply of fuel from the compression chamber to said combustion chambers at stated intervals, and means for adjusting said rings to the inner surfaces of said chambers.

11. In a combustion engine, the combination of a single compression chamber provided with a rotatable ring tangent to the inner surface of said chamber, a piston rod also mounted within said chamber for causing the rotation of said ring, a plurality of combustion chambers each provided with a rotatable ring tangent to the inner surface of its respective chamber, each of said chambers being provided with a piston rod for causing the operation of said rings, said rings and said rods each serving to form a partition in its respective chamber.

12. In a combustion engine, the combination of a main casing, a plurality of compression and combustion chambers provided with adjustable walls mounted within said casing.

13. In a combustion engine, the combination of a main cylinder, of a plurality of separating walls adapted to fit within said cylinder, and means for adjustably mounting said walls within said cylinder.

14. In a combustion engine, the combination of a main casing, a plurality of compression and combustion chambers provided with adjustable walls mounted within said casing, each of said walls provided with a flange, a rotatable ring for each of said chambers, said flanges serving to support said rings.

15. In a combustion engine, the combination of a compression chamber, a plurality of combustion chambers, a fuel intake port for the compression chamber, a fuel exhaust port in said compression chamber for each of said combustion chambers, means comprising a series of pipes for connecting each of said exhaust ports with an allotted combustion chamber to allow fuel to be admitted to each combustion chamber in sequence.

16. In a combustion engine, the combination of a compression chamber, a plurality of combustion chambers, a fuel intake port for the compression chamber, means comprising a series of pipes extending from the compression chamber to each of said combustion chambers for supplying fuel thereto in sequence.

17. In a combustion engine, the combination of a main casing containing a plurality of compression and combustion chambers, a shaft extending through said chambers, a space provided between said shaft and said chambers, a rotary pump also mounted within said casing for causing the circulation of water between said shaft and said chambers.

18. In a combustion engine, the combination of a single compression chamber provided with a rotating ring having a plurality of openings, of a plurality of combustion chambers separate from said compression chamber, means controlled by said ring in its rotation for admitting fuel through said openings to said combustion chambers in sequence.

19. In a combustion engine, the combination of a single compression chamber and a plurality of combustion chambers each comprising an individual unit, a common shaft extending through all of said chambers, means controlled from said compression chamber during the rotation of said shaft for admitting fuel to each of said combustion chambers in sequence.

20. In a combustion engine, the combination of a single compression chamber provided with a rotatable ring, a piston rod for rotating said ring, said rod and ring serving to divide said compression chamber, a plurality of combustion chambers each provided with a rotatable ring and a piston rod, means controlled by said piston rods for compressing the fuel, and means controlled by said rings for regulating the supply of fuel to be compressed.

21. In a combustion engine, the combination of a single compression chamber provided with a rotatable ring, a plurality of combustion chambers each provided with a rotatable ring, means controlled by said rings for regulating the supply of fuel from said compression chamber to said combustion chambers, and means for adjusting the position of said rings in said chambers.

22. In a combustion engine, the combination of a compression chamber provided with a rotatable ring, a plurality of combustion chambers, a pipe extending from said compression chamber to each one of said combustion chambers, means controlled by said ring for admitting fuel to each of said combustion chambers through said pipes in sequence.

23. In a combustion engine, the combination of a compression chamber having a rotatable ring provided with a plurality of openings, a plurality of combustion chambers, a pipe extending from said compression chamber to each one of said combustion chambers, means controlled by said ring in its rotation for causing the openings to engage said pipes in sequence to admit fuel to said combustion chambers.

In testimony whereof I affix my signature in the presence of two witnesses.

ARTHUR A. AUST.

Witnesses:
H. POLATSEK,
A. McCUNE.